June 13, 1944.      J. J. DOWNEY      2,351,253
ARMORED OBSERVATION PORT
Filed Aug. 27, 1941

INVENTOR
JAMES J. DOWNEY
BY Charles S. Evans
his ATTORNEY

Patented June 13, 1944

2,351,253

UNITED STATES PATENT OFFICE 2,351,253

ARMORED OBSERVATION PORT

James J. Downey, San Mateo, Calif., assignor of twenty-five per cent to Joseph J. Downey and twenty-five per cent to Fitz-Gerald Ames, both of San Francisco, Calif.

Application August 27, 1941, Serial No. 408,475

2 Claims. (Cl. 109—58.5)

My invention relates to observation ports for armored vehicles and other compartments, and particularly to a device for protecting an observer while looking through an observation port.

In order to protect the occupants of armored compartments such as army tanks, observation and gun sighting posts, and similar armored compartments, it has been common practice to provide relatively narrow observation ports through which an observer is afforded a limited field of vision. Since the danger that an observer will be hit by a projectile entering the port increases with the size of the port opening, such ports are ordinarily made as small as is practicable. In so reducing the risk of injury to the observer, the field of vision is diminished; but at best the observer is subjected to a substantial risk.

It is among the objects of my invention to provide an armored port which will permit the passage of light through the port, but at the same time provide an obstruction over the major portion of the port.

Another object is to provide an armored observation port, which will protect an observer to a degree which is high with respect to the field of vision afforded the observer.

A further object is to provide a simple and effective structure for mounting and operating mechanism for obstructing a port over the major part of its area while permitting satisfactory vision through the entire area of the port.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Figure 1:
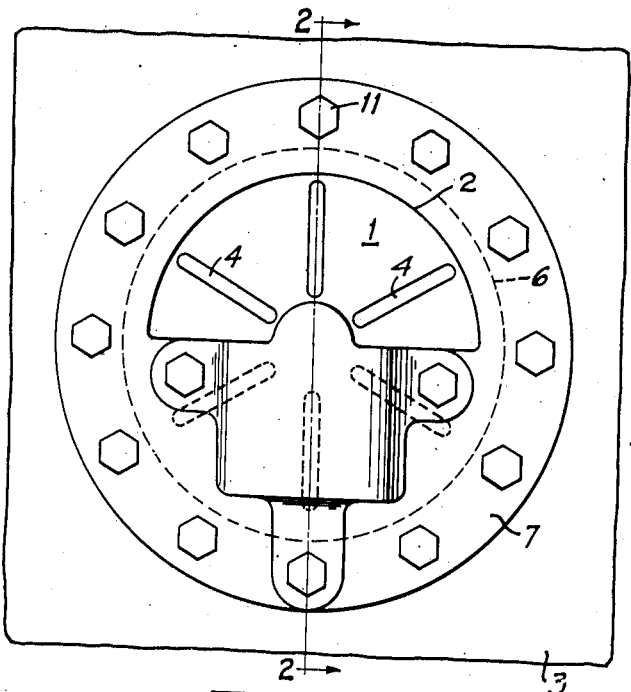
Figure 1 is an elevation of an embodiment of my invention as mounted upon the inside of an armored compartment wall.
Figure 2:
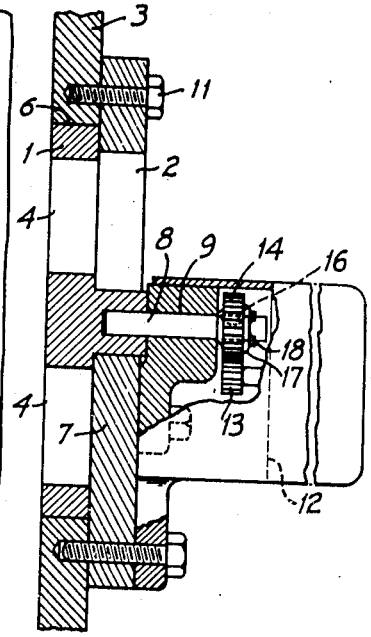
Figure 2 is a sectional view taken upon the line 2—2 of Figure 1, parts being shown in side elevation.

In terms of broad inclusion, my invention comprises an armored port primarily useful as an observation port for armored vehicles, but also useful for other purposes. A rotor, journaled across a port of a size and shape permitting a desired cone of vision, is provided with a plurality of slots. The rotor is turned to move the slots across the port, at intervals not less than the period of visual retention of an observer, so as to permit continuing vision through the port and moving slots while the body of the rotor obstructs the major portion of the port. For a port of ordinary size, the degree of protection is many times increased; and the safety factor is correspondingly improved as the size of the port is enlarged to give a wider field of vision.

My invention also contemplates a form and arrangement of parts in which the rotor and driving means therefor are carried by a housing member as a unitary structure, which may be readily mounted upon an armoring wall in association with an observation port of a desired size and shape.

In terms of greater detail, the device of my invention comprises an armoring rotor 1 journaled in association with a port 2 in the armoring wall 3 of an armored compartment. The rotor 1 is provided with a plurality of slots 4. During rotation of the rotor, the slots 4 are moved successively across the port 2 at intervals not less than the period of visual retention of an observer, that is, about one-sixteenth to one-twentieth of a second. The wall and rotor may be made of any suitable armoring material, such as armor plate or other material of armoring thickness.

In the illustrated embodiment, the rotor 1 is arranged to fit within an opening 6 formed in the wall 3. The rotor is journaled upon a housing 7 by means of a shaft 8 secured to the rotor and engaging a bearing 9. The housing is secured against the wall 1 by any suitable securing means, as for example cap screws 11.

The rotor 1 is turned by means of suitable driving connections within the housing 7. By way of illustration, I have shown a motor 12 connected to the shaft 8 by gears 13 and 14. For convenience of assembly, the gear 14 may be keyed to the shaft 8 by a Woodruff key 16. A washer 17 and split spring ring 18 serve to retain the gear 14 upon the shaft 8.

In the illustrated embodiment, the observation port 2 is formed in the housing 7. The port 2 may be of any desired size and shape, depending upon the field of vision which is required, and the degree of protection which is to be afforded the observer. Figure 1 illustrates a port 2 of substantially semicircular form, such as to afford a relatively wide cone of vision. The size may of course be varied to suit the requirement of any particular installation.

The rotor 1 covers the port 2 except for the area of the slot or slots 4 which at any instant are alined with the port. The number and width of the slots 4 may be varied within wide limits. I have found that a series of six relatively narrow radial slots 4, regularly spaced, affords satisfactory results.

The rotor 1 is turned at a speed which will cause the slots to be moved successively to each instantaneous position occupied by the immediately preceding slot at intervals not less than the period required for a visual impression to fade from the retina of an observer's eyes. The interval should be not less than one-sixteenth of a second, and is preferably one-twentieth of a second or less. The interval may be reduced to any desired degree short of the speed of light, but no material advantage is obtained by reducing the interval to less than about one-twentieth to one-thirtieth of a second.

As each slot 4 is moved progressively across the port 2, the light which passes through the slot produces a visual impression upon the retina of the observer's eyes at each instantaneous position which the slot occupies as it crosses the port 2. Before the visual impression so received through one slot 4 fades from the retina, the next succeeding slot is moved to each successive instantaneous position of the preceding slot, thereby renewing the impression. In this manner, the visual impression received through each slot 4 as it moves across the port 2 is repeated as each successive slot crosses the port. The result is a continuing sequence of visual impressions which gives a continuing vision through the full area of the port, notwithstanding the fact that the major portion of the port 2 is at all times obstructed by the areas of the rotor between the slots 4.

Figure 3:
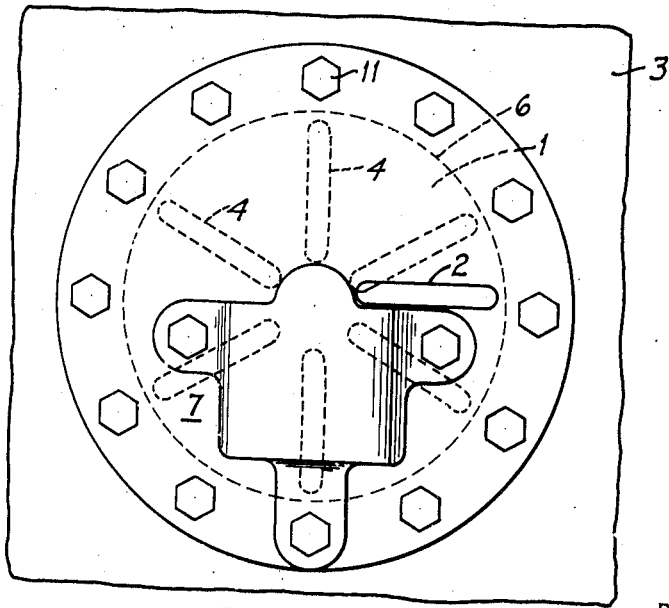
Figure 3, is a view similar to Figure 1, showing a modified form of the port.

The maximum area through which a projectile may enter the port is limited to the area of the portion of the slots which at any instant is aligned with the port. Since the slots 4 are relatively narrow, the mathematical chance that a projectile or other solid object will pass through the port is rendered remote.

Where a wide field of vision is not required, and maximum protection for the observer is desired, the port 2 may be in the form of a relatively narrow horizontal slot, as illustrated in Figure 3 of the drawing. The port will be open to admit a solid object only for the period required for each successive slot 4 to pass the port 2, and will be obstructed for a major portion of the time. By making the slots 4 narrower than the port slot 2, the area and period of exposure of an observer may be proportionally lessened.

If a wide range of vision is required, the port 2 may be enlarged to any desired degree to give an appropriate area through which the observer may see. The protection afforded the observer will of course be reduced in proportion to any increase in the size and number of slots 4 which will be aligned with the port 2 at any instant. An installation designed for any particular purpose will necessarily involve a compromise between maximum protection with the minimum field of vision, and a greater field of vision with lessened protection to the observer.

Clarity of vision will vary somewhat in accordance with the number and size of the slots 4. If the slots are narrow, and few in number, the amount of light which will be admitted through the slots may be so restricted that the view may appear somewhat darkened, and some loss of clarity in detail may result. By increasing the slots in size or number or both, the clarity of vision may be improved. Since vision depends upon the amount of light passing through the slots 4, it is immaterial whether the rotor be provided with only a few relatively wide slots, or a greater number of relatively narrow slots, so long as the total area will admit an adequate amount of light. The use of narrow slots is preferred because of the lessened possibility that a projectile will enter a slot.

My invention is primarily intended for use on armored vehicles, army tanks, military planes, ships, observation posts, and other armored compartments, where it is necessary for an observer to see his surroundings with minimum exposure to risk of injury by objects which may be projected into the compartment. The size, shape, and positioning of the port 2 and rotor 1 will of course vary with the nature and purpose of the armored compartment for which it is designed.

Instead of providing a motor 12, suitable driving connections may be provided for operating the rotor 1 from some other source of energy. For example, in the case of armored vehicles, suitable connections may be provided for utilizing energy derived from the prime mover of the vehicle, or from some other available source. In some cases, it may even be desirable to provide a crank for operating the rotor manually. Since such driving connections may be readily substituted for the motor 12 illustrated in the drawing, a detailed disclosure of such modifications is omitted from the present specification.

The device of my invention is also useful for protecting a source of light from injury by objects projected thereagainst. For example, a rotor of the character hereing described may be journaled to cover a search light, or similar light source. Light passing from the source through the slots of the rotor will give the effect of a continuing beam, but the rotor will effectively shield the major position of the source of light from damage by projectiles or other objects.

I claim:

1. An armored observation port for armored compartments which comprises a wall of armoring material having a circular opening, a rotor housing member secured to the wall upon its inner side and provided with an observation port aligned with a portion of the opening, a rotor of armoring material journaled upon the housing member and positioned within the wall opening with its outer surface substantially flush with the outer surface of the wall, said rotor having a plurality of slots arranged to be moved successively into alignment with the observation port, and a motor mounted upon the inner side of the rotor mounting means and connected to the rotor.

2. In combination, an armoring wall having a circular opening, a circular slotted armoring rotor rotatably journaled within the opening with its outer surface flush with the outer surface of the wall, a housing secured in fixed position upon the inner side of the wall to cover a major portion of the opening and rotor, said housing having an observation port past which the slots of the rotor are movable, and driving means mounted upon the housing and connected to the rotor.

JAMES J. DOWNEY.